(12) United States Patent
Rohloff (10) Patent No.: US 9,628,450 B2
(45) Date of Patent: *Apr. 18, 2017

(54) SYSTEM AND METHOD FOR MERGING ENCRYPTION DATA WITHOUT SHARING A PRIVATE KEY

(71) Applicant: RAYTHEON BBN TECHNOLOGIES CORP., Cambridge, MA (US)

(72) Inventor: Kurt Ryan Rohloff, South Hadley, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/254,666

(22) Filed: Apr. 16, 2014

(65) Prior Publication Data
US 2015/0304287 A1 Oct. 22, 2015

(51) Int. Cl.
*H04L 29/06* (2006.01)

(52) U.S. Cl.
CPC ...... *H04L 63/0442* (2013.01); *H04L 63/0428* (2013.01); *H04L 63/061* (2013.01)

(58) Field of Classification Search
CPC .............. H04L 63/0442; H04L 63/061; H04L 63/0892; H04L 63/04; H04L 63/045; H04L 63/0471; H04L 63/0428
See application file for complete search history.

(56) References Cited

U.S. PATENT DOCUMENTS

| | | |
|---|---|---|
| 6,477,652 B1 | 11/2002 | Yen et al. |
| 6,986,044 B1 | 1/2006 | Inada |
| 7,373,517 B1 | 5/2008 | Riggins |
| 8,363,744 B2 | 1/2013 | Agee et al. |
| 2003/0044017 A1 | 3/2003 | Briscoe |
| 2003/0163697 A1 | 8/2003 | Pabla et al. |
| 2009/0063861 A1* | 3/2009 | Chu .............................. 713/171 |
| 2010/0220856 A1 | 9/2010 | Kruys et al. |
| 2011/0085665 A1 | 4/2011 | Hong et al. |
| 2011/0293093 A1 | 12/2011 | Sun et al. |
| 2012/0243681 A1 | 9/2012 | Francis |
| 2013/0142336 A1 | 6/2013 | Fries et al. |
| 2013/0216044 A1* | 8/2013 | Gentry et al. ................ 380/277 |
| 2013/0272521 A1 | 10/2013 | Kipnis et al. |
| 2013/0318347 A1 | 11/2013 | Moffat |
| 2014/0334624 A1 | 11/2014 | Bernsen |

(Continued)

OTHER PUBLICATIONS

"Secure Voice over IP (SVoIP) vs. Voice over Secure IP (VOSIP) Installations", General Dynamics, C4 Systems, 2010 (4 pgs.).

(Continued)

*Primary Examiner* — Kendall Dolly
(74) *Attorney, Agent, or Firm* — Lewis Roca Rothgerber Christie LLP (57) ABSTRACT

A method for data privacy in a distributed communication system including a plurality of client terminals merges encrypted streaming data using tree-like encryption key switching and without sharing any private keys in a distributed communication system. The merged data is then sent to client terminals to be further process by respective client terminals.

18 Claims, 9 Drawing Sheets

(56) References Cited

U.S. PATENT DOCUMENTS

2015/0249649 A1   9/2015   Rohloff

OTHER PUBLICATIONS

Dunte, et al., "Secure Voice-over-IP", IJCSNS International Journal of Computer Science and Network Security, vol. 7, No. 6, Jun. 2007 (pp. 63-68).
Gentry, "A Fully Homomorphic Encryption Scheme", Dissertation Submitted to the Department of Computer Science and the Committee on Graduate Studies of Stanford University in Partial Fulfillment of the Requirements for the degree of Doctor of Philosophy, Sep. 2009 (209 pgs.).
Gentry, "Computing Arbitrary Functions of Encrypted Data", Communications of the ACM, vol. 53, No. 3, Mar. 2010 (pp. 97-105).
Gentry, et al., "A Working Implementation of Fully Homomorphic Encryption", IBM T.J. Watson Research Center, 2009 (5 pgs.).
Halevi, et al., "Design and Implementation of a Homomorphic-Encryption Library", Apr. 11, 2013 (46 pgs.).
Lyubashevsky, et al., "A Toolkit for Ring-LWE Cryptography", May 16, 2013 (51 pgs.).

\* cited by examiner

SYSTEM AND METHOD FOR MERGING ENCRYPTION DATA WITHOUT SHARING A PRIVATE KEY

STATEMENT REGARDING FEDERALLY SPONSORED RESEARCH

This invention disclosure is related to a government contract number FA8750-11-C-0098. The U.S. Government has certain rights to this invention.

FIELD OF THE INVENTION

The present invention relates to data privacy and encryption and more specifically to a system and method for merging encryption data without sharing any private keys in a distributed communication system.

BACKGROUND

A typical system for enabling multiple entities to exchanging data or communicate with one another may include a form of a distributed communication system, in which multiple parties to a communication are connected to each other through a network and a central hub or switch. In many circumstances, where that data being exchanged includes sensitive information, it is important to maintain privacy from external security threats. Additionally, in some circumstances, the network itself may not be reliably secure or trustworthy. For example, various parties engaging in a teleconference may be speaking about sensitive information from various trusted locations throughout the world, but the telecommunication system or the central data mixer used to transmit data between the parties may not be secure or trustworthy.

There has been prior work on the mixing of data of different rates, however none of those approaches are compatible with the homomorphic encryption scheme such that privacy-preserving mixing can be performed, for example, for encrypted voice over IP (VoIP).

Moreover, these prior approaches do not cover encrypted VoIP teleconferencing, where encryption keys do not need to be shared with a VoIP mixer, in a manner that scales linearly with the number of participants (clients). Many consumer VoIP solutions do not support encryption of the signaling path or the media. As a result, the lack of encryption makes it relatively easy to eavesdrop on VoIP calls when access to the data network is possible.

SUMMARY OF THE INVENTION

In some embodiments, the present invention is directed to a system and method for merging encryption data using a tree-like mixing encryption key switching, and without sharing any private keys.

In some embodiments, the present invention is a method for data privacy in a distributed communication system including a plurality of client terminals. The method includes: receiving by a second client terminal of the plurality of client terminals, a first public key from a first client terminal of the plurality of client terminals; generating a second/first key switch hint for the first client terminal, by the second client terminal, using the first public key and a second private key of the second client terminal; transmitting the second/first key switch hint and second encryption data from the second client terminal to a mixer; receiving by a fourth client terminal of the plurality of client terminals, a third public key from a third client terminal of the plurality of client terminals; generating a fourth/third key switch hint for the third client terminal, by the fourth client terminal, using the third public key and a fourth private key of the fourth client terminal; transmitting the fourth/third key switch hint and fourth encryption data from the fourth client terminal to the mixer; receiving by the third client terminal, the first public key from the first client terminal; generating a third/first key switch hint for the first client terminal, by the third client terminal, using the first public key and a third private key of the third client terminal; transmitting the third/first key switch hint from the third client terminal to the mixer; and using, by the mixer, the second/firth key switch hint and the second encrypted data from the second client terminal to switch the second encrypted data to generate first switched encrypted data.

The method further includes: adding, by the mixer, the first switched encrypted data to the first encryption data received from the first client terminal to output first summed encrypted data; using, by the mixer, the fourth/third key switch hint and the third encrypted data from the third client terminal to switch the fourth encrypted data to generate second switched encrypted data; adding, by the mixer, the second switched encrypted data to the third encryption data received from the third client terminal to output second summed encrypted data; using, by the mixer, the third/first key switch hint and the second summed encrypted data to switch the second summed encrypted data to generate third switched encrypted data; adding, by the mixer, the third switched encrypted data to the first summed encrypted data to output third summed encrypted data; and transmitting the third summed encrypted data to the first client terminal to be decrypted by the first client terminal.

Additionally, the first client terminal receives the second public key from the second client terminal and generates a first/second key switch hint for the second client terminal, using the second public key and its own first private key. The first/second key switch hint and first encryption data from the first client terminal are then sent to the mixer. The mixer then the first/second key switch hint and the third summed encrypted data to switch the third summed encrypted data to generate fourth switched encrypted data. The fourth switched encrypted data is then sent to the second client terminal to be decrypted by the second client terminal.

This tree-like key switching scheme is repeated for the third client terminal receiving the first public key from the first client terminal and generating a third/first key switch hint for the first client terminal; and the third client terminal receiving the fourth public key from the fourth client terminal and generating a third/fourth key switch hint for the fourth client terminal In some embodiments, the mixer combines the first, second, third and fourth encrypted data representation outputs in a matrix, a first column of the matrix including the first encryption data representation output, a second column of the matrix including the second encryption data representation output, a third column of the matrix including the third encryption data representation output, and a fourth column of the matrix including the fourth encryption data representation output.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In some embodiments, the present invention is a system and method for merging encryption data using encryption key switching and without sharing any private keys in a distributed communication system, for example, Voice over IP (VoIP) teleconferencing systems, video conferencing systems, control systems, detection systems, accounting systems, and the like.

In some embodiments, the present invention provides a system and method for parties (e.g., several client terminals) to have privacy-preserving teleconferences, where communication privacy is maintained despite all communications of the clients being observed during the teleconference, even at the teleconference mixer. This approach uses an alternative key sharing capability, in which client terminals share their public keys with each other before a teleconference starts. The present invention improves upon the prior approaches, because in the scheme of the present invention, the public keys can be shared at any time prior to the start of the data communication that is convenient. This reduces the use of communication and computation resources at the start of the communication.

The invention uses key switch hints to delegate decryption capability from one client (terminal) to another. After delegating decryption capability to an intended client (terminal), the client can decrypt the encrypted data, which is delegated to it. As a result, the system and method of the present invention require less memory compared to methods, which require a VoIP mixer to store m key switch hints where m is the number of client terminals.

In some embodiments, in the case of teleconferencing, the clients encode their voice samples with an additive encoding scheme, encrypt their encoded voice data with an additive homomorphic encryption scheme, and send their encrypted voice (data) samples to a mixer. The mixer switches all encrypted data into respective data representations to respective client terminals, where each data representation can be decrypted by the intended (recipient) client. The mixer performs an encrypted homomorphic addition on the encrypted voice (data). The mixer sends the results back to the clients. The clients then decrypt, decode and play back the resulting decrypted voice (data). This scheme pre-shares public keys for an additive homomorphic encryption scheme, performs key switching and requires that the clients agree on a common additive encoding scheme.

Figure 1:
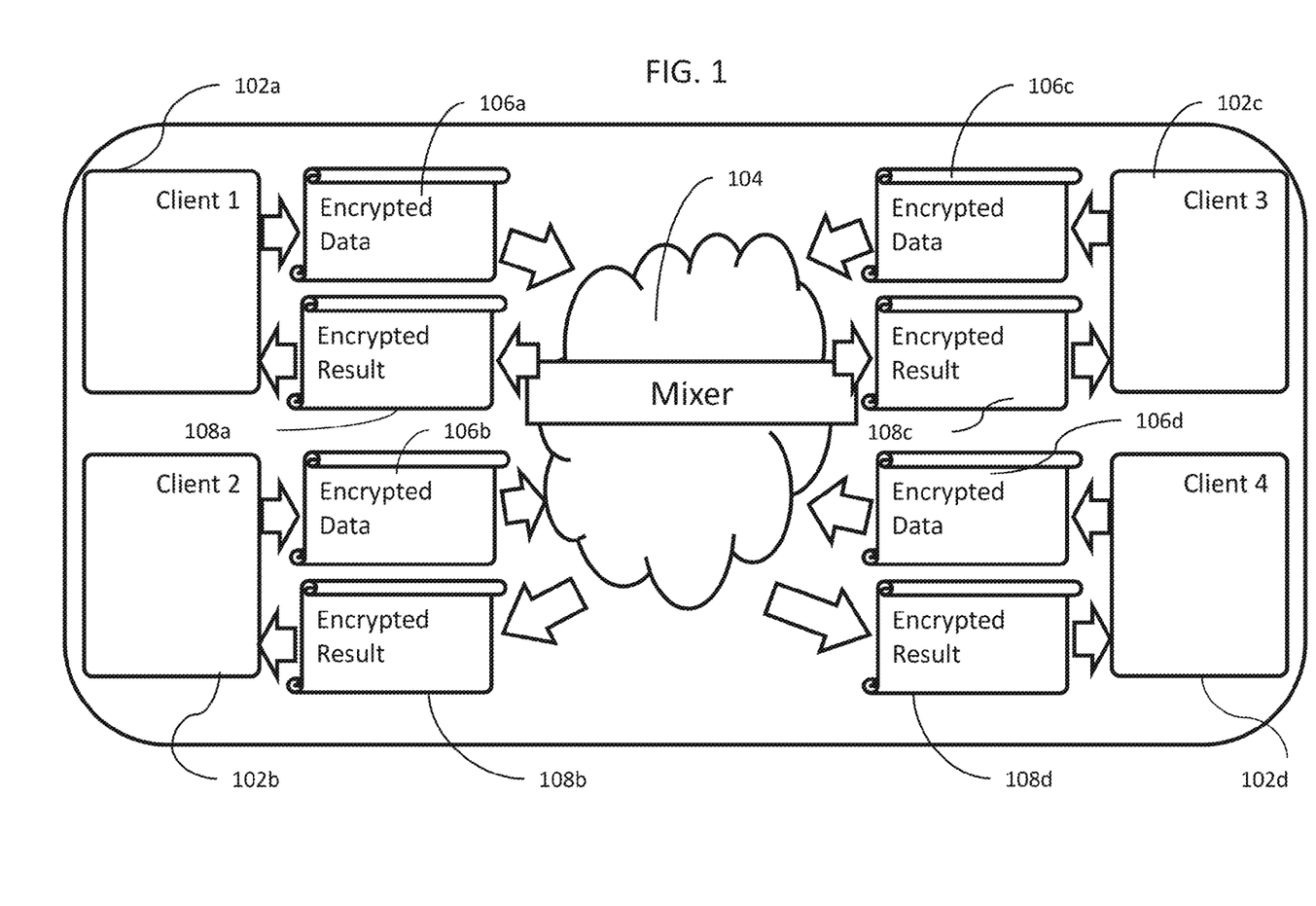
FIG. 1 shows an exemplary block diagram for a distributed communication system, according to some embodiments of the present invention.

FIG. 1 shows an exemplary block diagram for a distributed communication system, according to some embodiments of the present invention. Each of the clients 102a, 102b, 102c and 102d samples voice data (in the case of voice), encodes it, encrypts it and sends the encrypted data 106a, 106b, 106c or 106d to a mixer 104. The mixer 104 operates on the encrypted data and sends the results 108a, 108b, 108c and 108d back to the respective client terminals, which are then decrypted, decoded and played back(in the case of voice) to the respective clients.

Any encryption system may be used with the system and method of the present invention that supports an additive homomorphism and key switching which could be implemented in a practical manner. A representational scheme is NTRU which can be made to both a Somewhat Homomorphic Encryption (SHE) scheme and a Fully Homomorphic Encryption (FHE) scheme, and which supports key switching.

Figure 2:
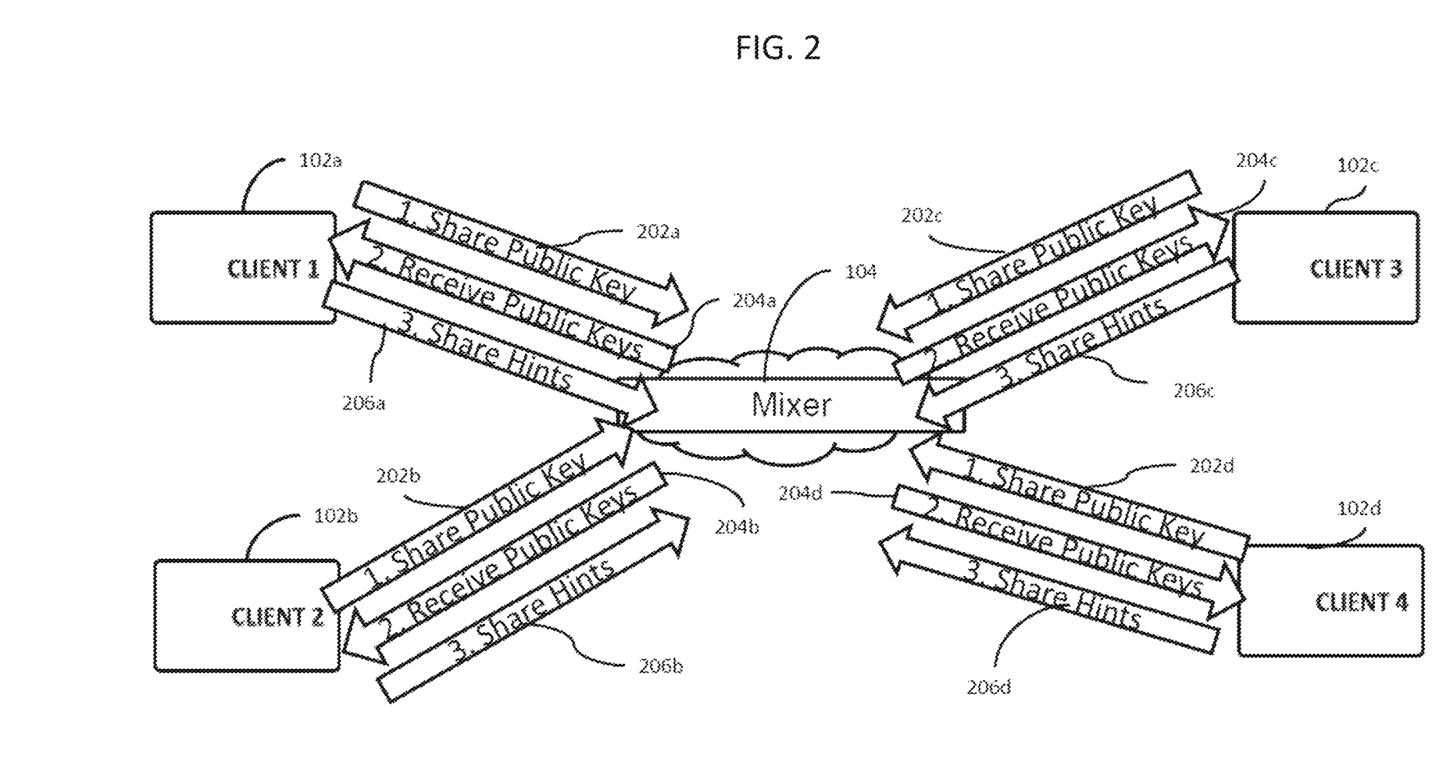
FIG. 2 shows an exemplary block diagram depicting keys and hints sharing, according to some embodiments of the present invention.

FIG. 2 shows an exemplary block diagram depicting keys and hints sharing, according to some embodiments of the present invention. The diagram illustrates a circular way (ring configuration), in which the public encryption keys are shared among the clients and hints shared with the mixer, in some embodiments of the present invention. As depicted, client terminals (clients) 102a, 102b, 102c and 102d share their public keys 202a, 202b, 202c and 202d, in a circular manner through, for example, a mixer (or other entity) 104. However, in some embodiments, a mixer need not be used to share keys, rather, other sources, including any of the client terminals may be used to share keys. This sharing only needs to be performed once and could be done in a batch manner, for example, every time a client joins, or every time a teleconference is organized. Mixer 104 sends public keys to clients and the clients receive the respected public keys (204a, 204b, 204c and 204d) to generate respective key switch hints 206a, 206b, 206c and 206d. These key switch hints are then used to switch respective encrypted data to corresponding data representations for each client. For example, as shown, client 102a sends it public key 202a to be shared and receives from one of the other clients 102b, 102c or 102d its public keys (202b, 202c or 202d), as shown by arrow 204a.

Figure 5:
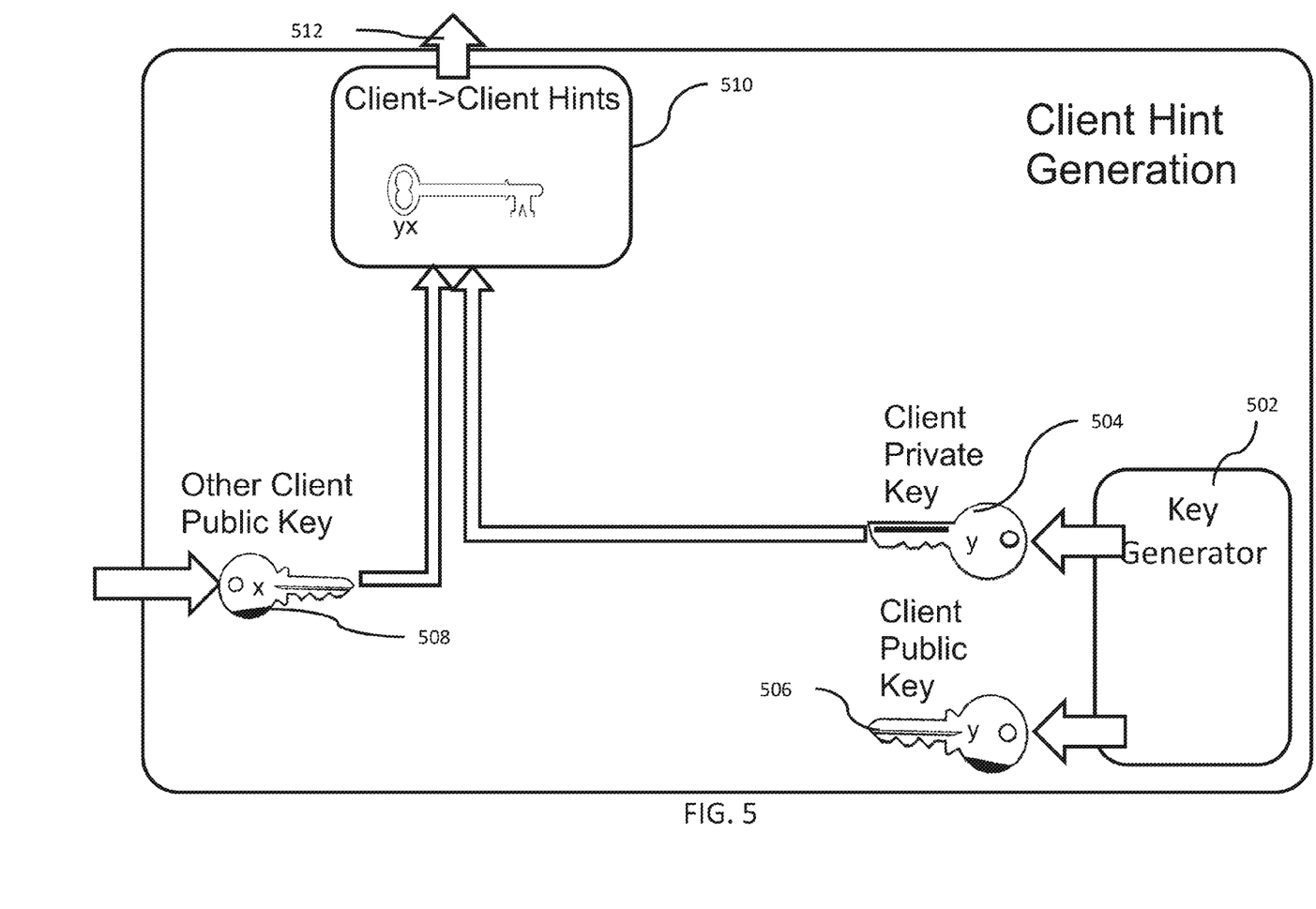
FIG. 5 shows an exemplary hint generation approach, according to some embodiments of the present invention.

FIG. 5 shows an exemplary hint generation approach, according to some embodiments of the present invention. For every client terminal, a key switch hint to be sent from that client terminal to the mixer is generated. All the key switch hints, but none of the keys, are shared with the mixer. As shown, each client terminal receives other clients' respective public keys 508 (for example, from the mixer) and uses its own private key 504 to generate a client1-to-next-client hint 512, by a key hint generation module 510. For example, client 102a and receives client's 102b public key 202b, as shown by 508 in FIG. 5. Client 102a then uses its own private key 504 to generate a client 102a-to-client 102b key switch hint 512.

The key switch hint generation procedure depends on the specific type of additive homomorphic encryption scheme used. Because private keys are not shared, no other key switch hints can be generated to take the result and delegate its decryption to another entity. An example of the key switching for NTRU case would be to convert a ciphertext of degree of at most d, encrypted under a secret key f1, into a degree-1 ciphertext c2 encrypted under a secret key f2 (which may or may not be the same as f1). The "hint" is $a_{12} = m \ast f_1 \hat{} d \ast f_2 \hat{} -1 \mod q$ for a short m∈R congruent to 1 modulo p. Then, m=p*e+1 can be chosen for a Gaussian distributed e.). The key switch operation is then defined as the function *:

KeySwitch(c1, a12): $c_2 = a_{12} \ast c_1 \mod q$.

Figure 3:
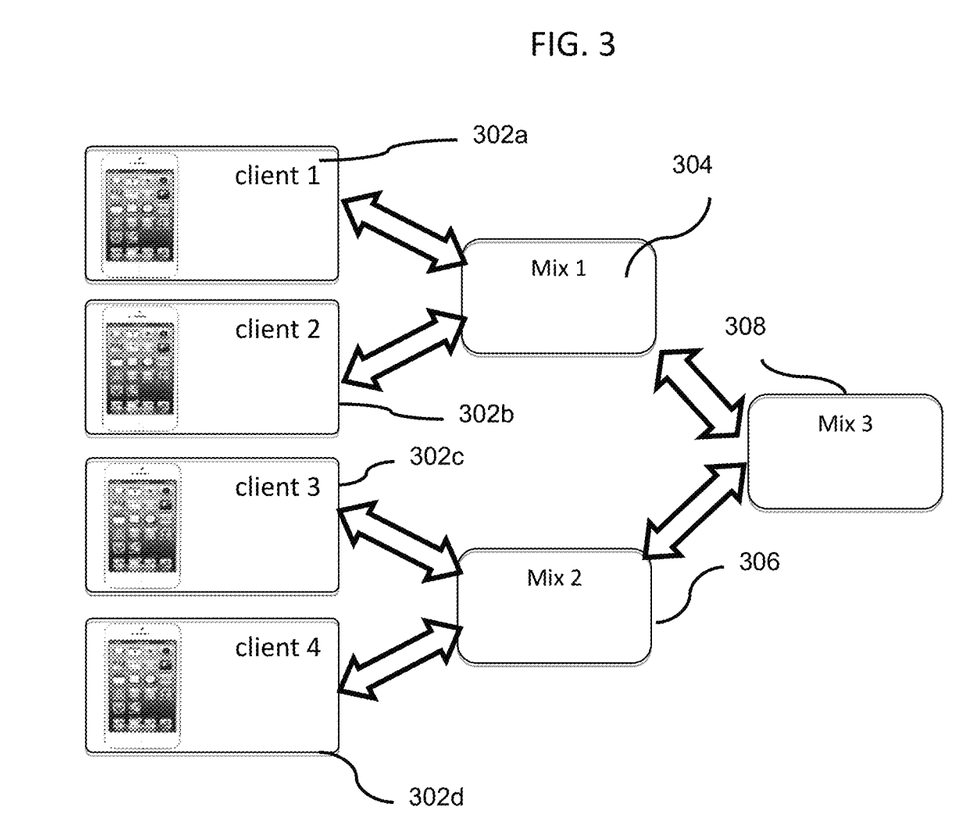
FIG. 3 is an exemplary block diagram illustrating arrangement of client terminals, according to some embodiments of the present invention.

FIG. 3 is an exemplary block diagram illustrating arrangement of client terminals, according to some embodiments of the present invention. As shown, the invention uses an arbitrary ordering of the clients. The clients (302a, 302b, 302c, 302d . . . ) are arbitrarily ordered from 1 to m and arranged in a tree like arrangement (tree structure). The clients are arranged in a hierarchy such that non-leaf-nodes in the tree representation of the clients is assigned the value of the lowest value clients in the tree. This minimum value up-flow is used when performing a mixing operation, such that when VoIP data is mixed, it is mixed according to the tree structure and the minimum node value is the key representation, in which the VoIP data is kept in. The encrypted data is mixed up through the tree and switched into the ciphertext representation of the client value assigned to each node. In the example of FIG. 3, key switch hints are generated so that client 1's public key is sent to client 2 to generate a (second/first) key switch hint, client 3's public key is sent to client 4 to generate a (fourth/third) key switch hint, client 1's public key is sent to client 3 to generate a (third/first) key switch hint, and so forth. In some embodiments, the key switch hints are stored by the mixer. The mixer then performs a tree-like mixing of the data.

For example, client 2's (302b) encrypted data is switched by the second/first key switch hint and them mixed with the encryption data from client 1 (302a), by a first mixing circuit 304. Similarly, client 4's (302d) encrypted data is switched by the fourth/third key switch hint and them mixed with the encryption data from client 3 (302c), by a second mixing circuit 306. The output of the first mixing circuit 304 is then mixed with the second mixing circuit 306, by a third mixing circuit 308. In some embodiments the mixing circuits perform a summation operation.

Figure 4A:
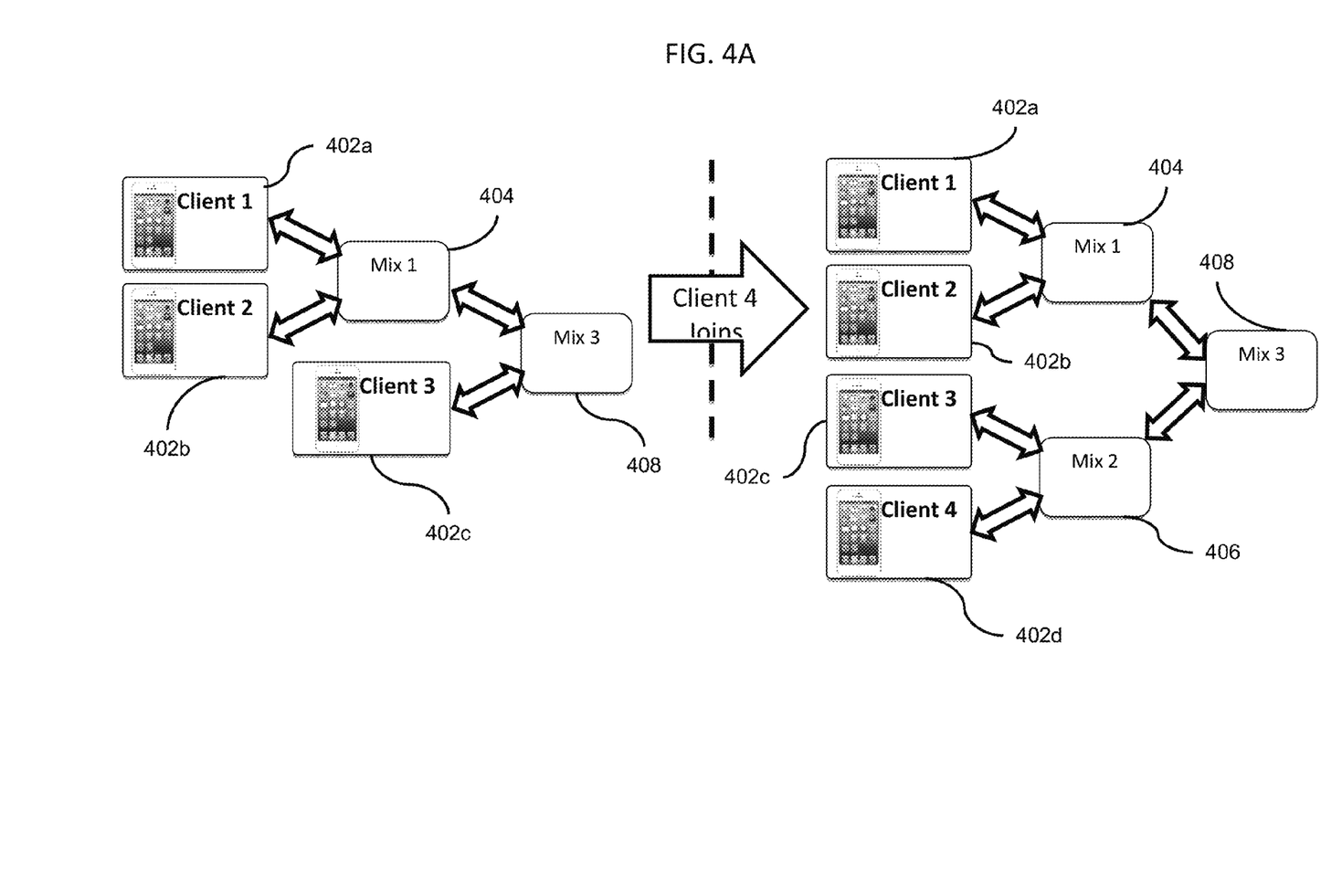
FIG. 4A is an exemplary block diagram illustrating adding a new client terminal, according to some embodiments of the present invention.

FIG. 4A is an exemplary block diagram illustrating adding a new client terminal, according to some embodiments of the present invention. Client terminals 402a, 402b and 402c are already in the tree structure configuration and client 4 needs to be added to the network (tree), for example, as a new user in a conference call or distributed data communication. As shown, when a new client 4 is added, it is added to the end of the list, as shown by client 4 402d. The new (larger) tree configuration would include client 2 (402b) receiving client 1's (402a) public key to generate a (second/first) key switch hint, client 4 (402d) receiving client 3's (402c) public key to generate a (fourth/third) key switch hint, client 3 receiving client 1's public key to generate a (third/first) key switch hint, and so forth. In general, any binary tree balancing scheme may be used to add clients to the tree structure. These tree balancing algorithms ensure that the tree is of minimum depth by trimming or moving tree branches to minimize tree depth.

Figure 4B:
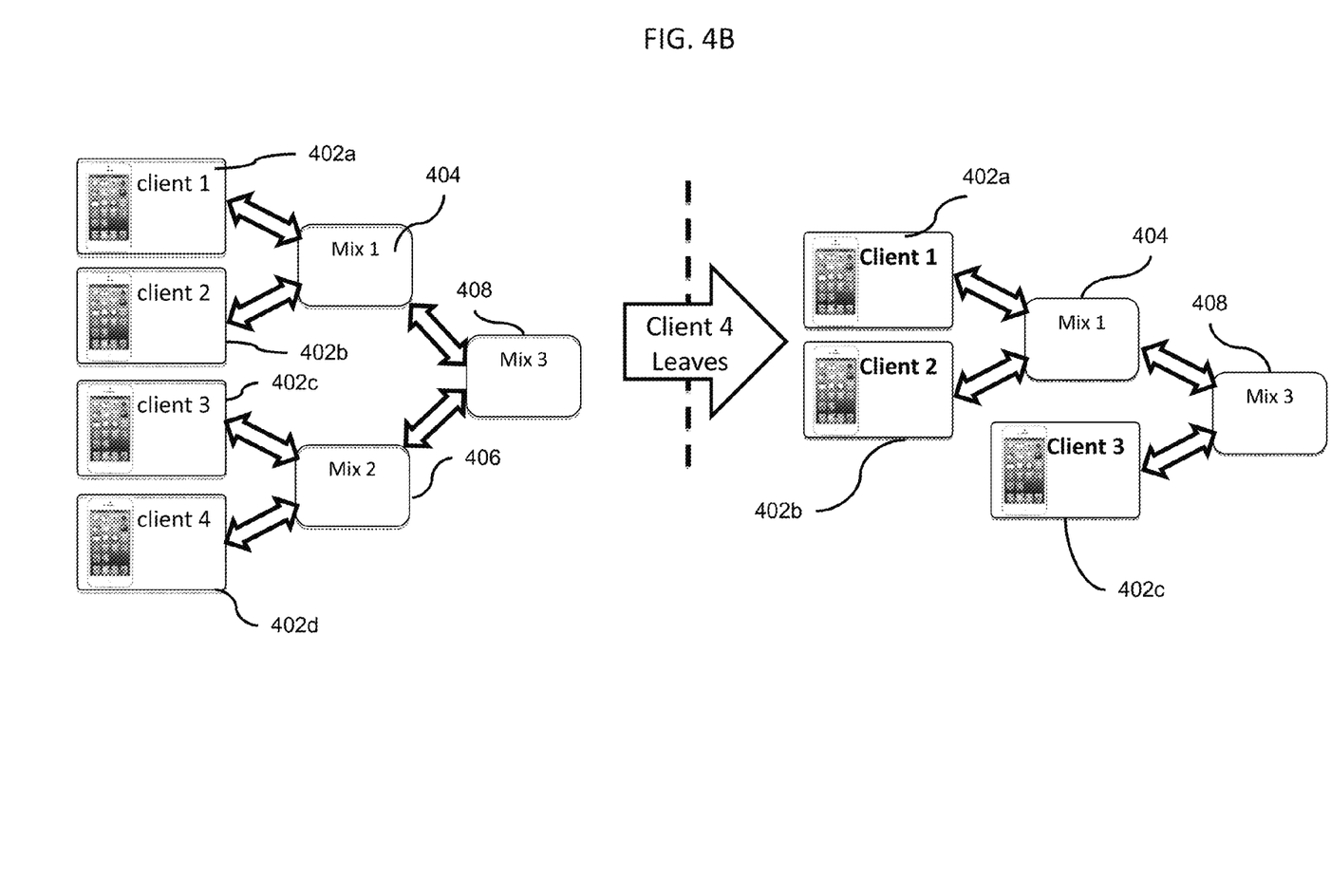
FIG. 4B is an exemplary block diagram depicting removing a new client terminal, according to some embodiments of the present invention.

FIG. 4B is an exemplary block diagram depicting removing a new client terminal, according to some embodiments of the present invention. As illustrated, when a client terminal 402d is removed, the tree structure is trimmed appropriately and internal node assignments are updated. Again, any tree balancing scheme may be used to reorganize the tree as nodes are removed. For example, 402a, 402b and 402c in the right side of FIG. 4B. The new (smaller) tree configuration would include client 2 402b receiving client1's (402a) public key, client 3 402c receiving client 2's public key, and client1 receiving client 3's public key.

Figure 6:
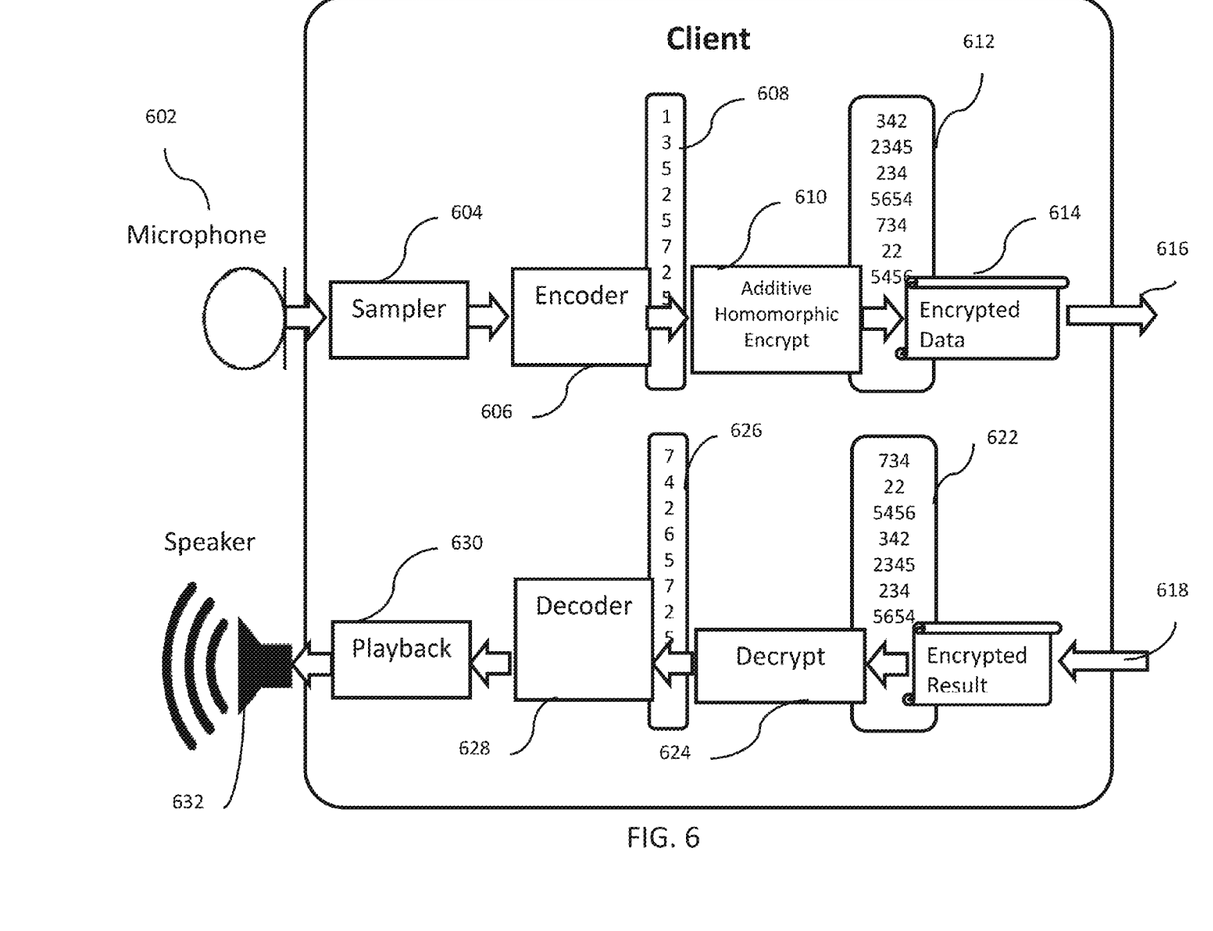
FIG. 6 shows data encryption and decryption by a client terminal, according to some embodiments of the present invention.

FIG. 6 shows data encryption and decryption by a client terminal, according to some embodiments of the present invention. The example illustrated by FIG. 6 relates to voice conferencing and includes a microphone 602, to capture the voice, a sampler 604 to sample the analog voice signals, and a playback 630 to play back the voice via a speaker 632. However, in case of general data communication without voice, microphone 602, sampler 604, playback 630 and speaker 632 may not be needed. As shown, a client terminal receives the voice data from a microphone 602, samples the voice data using the sampler 604 and feeds the sampled data to an encoder 606, which encodes the data and generates a data vector 608. The data vector 608 is then encrypted with client's private key by an additive homomorphic encryption module 610, using an additive homomorphic encryption scheme. The encrypted data is represented by vector 612, which is then sent 616 to a mixer to be operated on.

After the mixing operation is performed, the encrypted result 618 is received from the mixer, for example, in the form of a vector 622. The result 618 is decrypted by a decryption module 624 to generate a vector 626 of decrypted data to be decoded by the decoder 628. In case of voice data, the decrypted data is played back (630) over a speaker 632. In the case of non-voice data communication, the decoded data is send to a desired destination, without any play back. Here, all the hints but none of the keys are shared with the mixer. The key switch hint generation procedure depends on the specific type of additive homomorphic encryption scheme used. Because private keys are not shared, no other key switch hints can be generated to take the result and delegate its decryption to another entity. In some embodiments, a NTRU algorithm is used as a representational additive homomorphic encryption scheme which provides encryption and decryption functions.

The NTRU encryption algorithm is lattice based, which, is based on the hardness of the shortest vector problem in a lattice. Operations are based on objects in a truncated integer polynomial ring with convolution multiplication.

Figure 7:
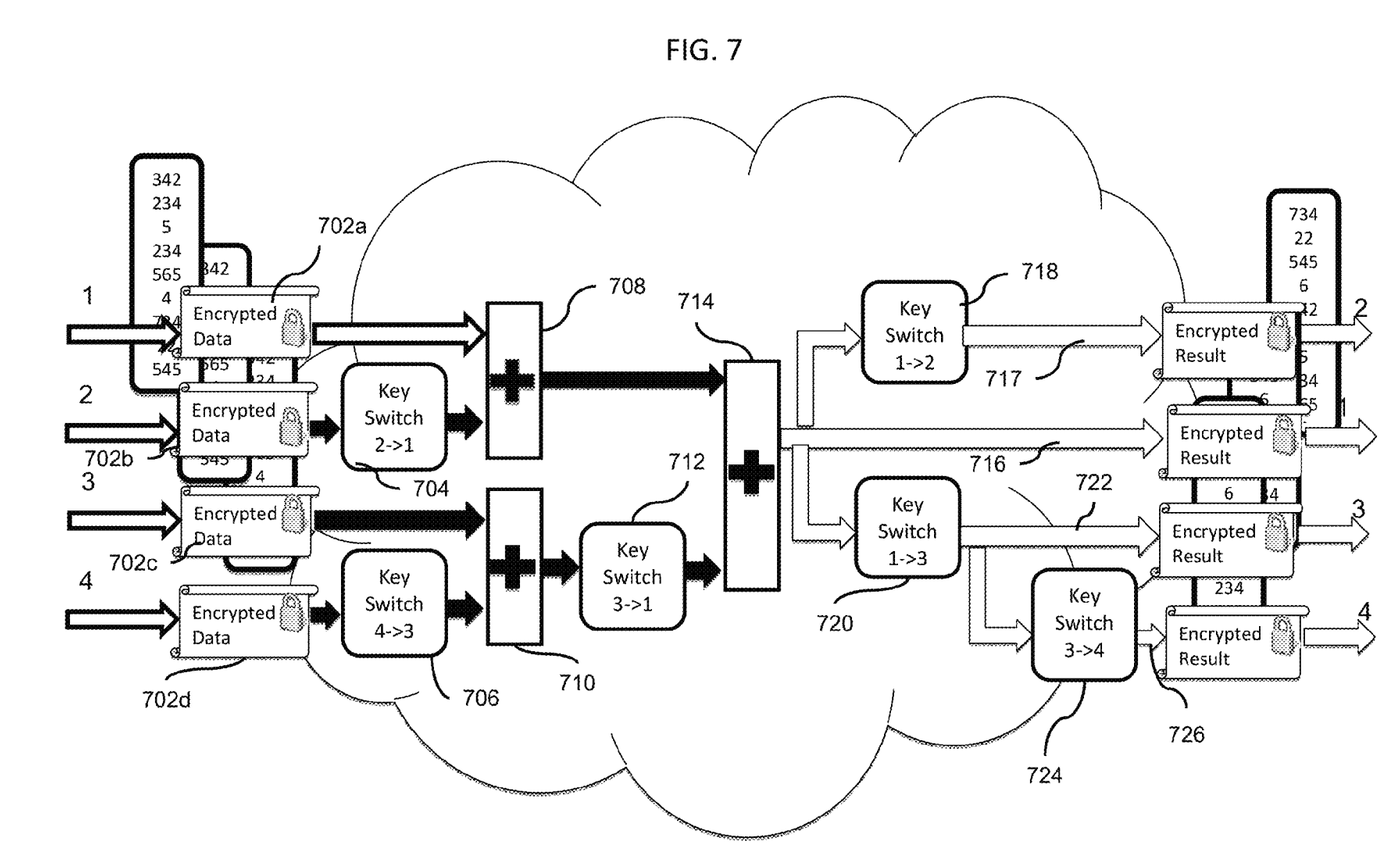
FIG. 7 depicts an exemplary block diagram of a mixer for mixing of encrypted data, according to some embodiments of the present invention.

FIG. 7 depicts an exemplary block diagram of a mixer for circular mixing of encrypted data, according to some embodiments of the present invention. In general, for a representational VoIP system with client terminals (1, . . . , m), data from client terminal 2 would be switched to client terminal 1 and added to the data from client terminal 1. Data from client terminal 4 would be switched to client terminal 3 and added to the data from client terminal 3. This result would be switched to client terminal 1 and added to the summation of the client terminal 1 and client terminal 2 data. This continues until the result of the summation of all clients represented under key 1 is obtained. This result would be sent to client terminal 1. The result would then be switched to key 2 and sent to client terminal 2. This result would then be switched to key 3 and sent to client terminal 3. This tree-like process would continue until all clients receive the appropriate data.

As shown in FIG. 7, encrypted data (702a, 702b, 702c and 702d) and key switch hints (not shown) are received from respective client terminals. A first key switch operation 704 is performed (for example, by a mixer) on the encrypted data 702b from client 2, using a second/first key switch hint generated by client 2 for client 1. The result is added by an adder 708 to the encrypted data 702a from client 1. Likewise, a second key switch operation 706 is performed on the encrypted data 702*d* from client 4, using a fourth/third key switch hint generated by client 4 for client 3. The result is added by an adder 710 to the encrypted data 702*c* from client 3.

A third key switch operation 712 is performed on the output of the adder 710, using a third/first key switch hint generated by client 3 for client 1 and added to the output of the adder 708, by the adder 714. The output 716 of the adder 714 is then sent to client 1 to be processed and decrypted by client terminal 1. The output 716 of the adder 714 is also sent to a fourth key switch operation 718 to key switch the data representation, using a first/second key switch hint generated by client 1 for client 2. The output 717 of the fourth key switch operation 718 is then sent to client 2 to be processed and decrypted by client terminal 2.

The output 716 of the adder 714 is also sent to a fifth key switch operation 720 to key switch the data representation, using a first/third key switch hint generated by client 1 for client 3. The output 722 of the fifth key switch operation 720 is then sent to client 3 to be processed and decrypted by client terminal 3. The output 722 of the fifth key switch operation 720 is also sent to a sixth key switch operation 724 to key switch the data representation, using a third/fourth key switch hint generated by client 3 for client 4. The output 726 of the sixth key switch operation 724 is then sent to client 4 to be processed and decrypted by client terminal 4, hence, a tree-like key switching scheme.

In some embodiments, the encrypted data switch representation outputs (716, 717, 724 and 726) for the clients 1, 2, 3 and 4, respectively, are combined in a matrix, in which each column of the matrix represents one of the encrypted data representation. The appropriate matrix column is then sent to the corresponding client. In some embodiments, the entire matrix may be sent to all the clients. Each client then extracts its own encrypted data representation (result) from the matrix. In the case of voice, it may be desired not to send back the same voice generated by a specific client to that specific client. Consequently, the entire matrix, minus the column to the specific client is sent to that specific client.

In some embodiments, for a representational NTRU-based additive homomorphic encryption scheme, the mixer would need to know the ring dimension and ciphertext modulus. This information may be embedded in the key switch hints. In some embodiments, each of the clients uses an authentication scheme to guarantee they are receiving public keys from intended recipients of their data. Conventional authentication schemes are used to authenticate a first client to a second client.

Figure 8:
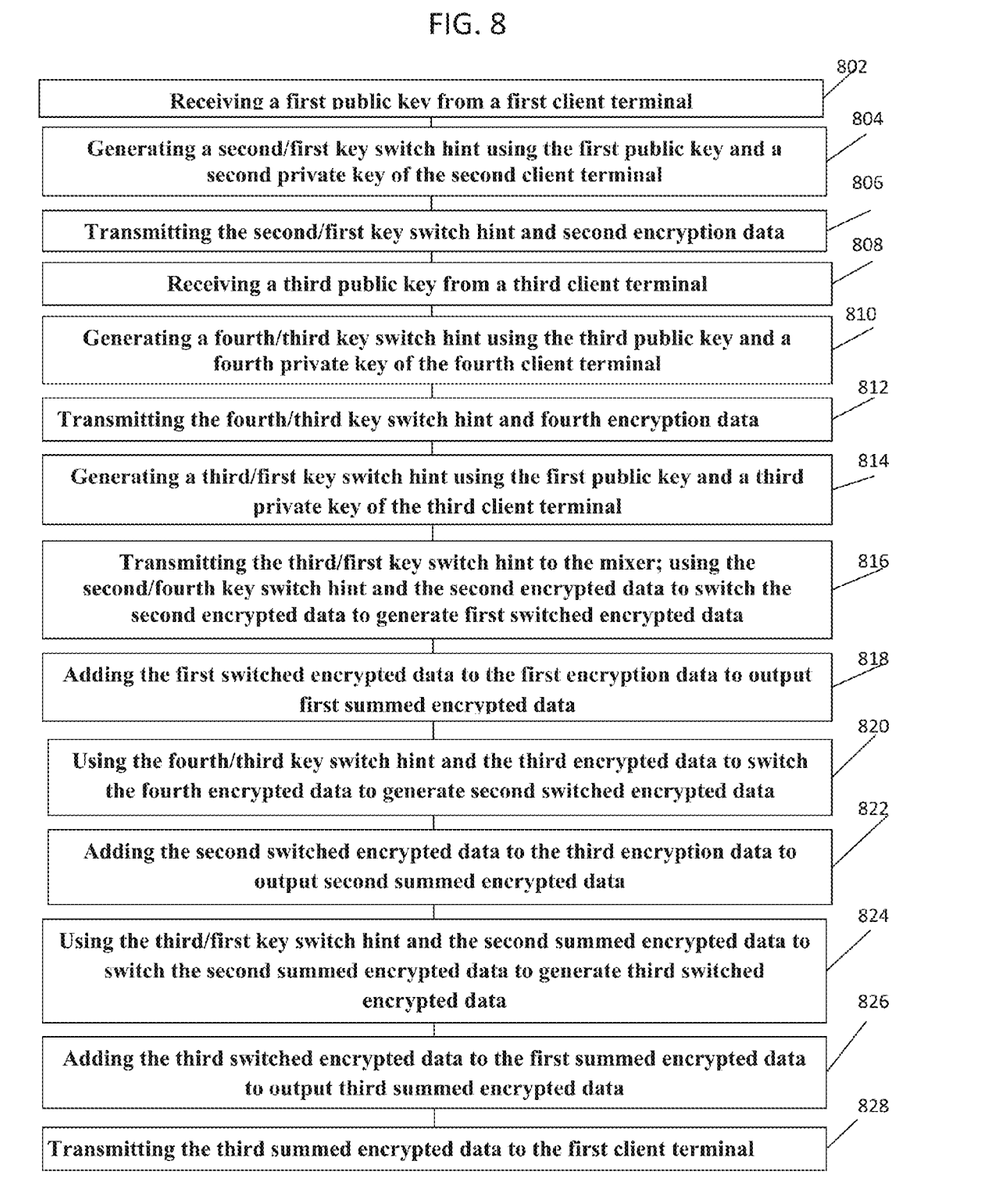
FIG. 8 is an exemplary process flow, according to some embodiments of the present invention.

FIG. 8 is an exemplary process flow, according to some embodiments of the present invention. In block 802, a first public key is received from a first client terminal of the plurality of client terminals. A second/first key switch hint is generated for the first client terminal, by the second client terminal, using the first public key and a second private key of the second client terminal, in block 804. For example, client 2 receives the public key of cleint 1 and then using its own private key, cleint 2 generates a second/first key switch hint for the client1. The second/first key switch hint and second encryption data from the second client terminal is then transmitted to a mixer or equivalent thereof, in block 806.

In block 808, a third public key is received from a third client terminal and a fourth/third key switch hint for the third client terminal is generated by the fourth client terminal, using the third public key and a fourth private key of the fourth client terminal, in block 810. The fourth/third key switch hint and fourth encryption data are then transmitted from the fourth client terminal to the mixer, in block 812. Similarly, in block 814, a third/first key switch hint is generated for the first client terminal by the third client terminal, using the first public key and a third private key of the third client terminal. The third/first key switch hint and third encryption data from the third client terminal data are then transmitted to the mixer, and the mixer uses the second/fourth key switch hint and the second encrypted data to switch the second encrypted data to generate first switched encrypted data, in block 816.

In block 818, the mixer adds the first switch encrypted data to the first encryption data to output first summed encrypted data. In block 820, the mixer uses the fourth/third key switch hint and the third encrypted data from the third client terminal to switch the fourth encrypted data to generate second switched encrypted data, and adds the second switched encrypted data to the third encryption data received from the third client terminal to output second summed encrypted data, in block 822.

The mixer then uses the third/first key switch hint and the second summed encrypted data to switch the second summed encrypted data to generate third switched encrypted data, in block 824; and adds the third switched encrypted data to the first summed encrypted data to output third summed encrypted data, in block 826. The third summed encrypted data is then transmitted to the first client terminal to be decrypted by the first client terminal.

Additionally, the first client terminal receives the second public key from the second client terminal and generates a first/second key switch hint for the second client terminal, using the second public key and its own first private key. The first/second key switch hint and first encryption data from the first client terminal are then sent to the mixer. The mixer then the first/second key switch hint and the third summed encrypted data to switch the third summed encrypted data to generate fourth switched encrypted data, as shown by output 717 in FIG. 7. The fourth switched encrypted data is then sent to the second client terminal to be decrypted by the second client terminal.

Moreover, the third client terminal receives the first public key from the first client terminal; generates a third/first key switch hint for the first client terminal, using the first public key and a third private key of the third client terminal; and transmits the third/first key switch hint and third encryption data to the mixer. The mixer then uses the third/first key switch hint and the third summed encrypted data to switch the third summed encrypted data to generate fifth switched encrypted data, as shown by output 722 in FIG. 7. The fifth switched encrypted data is then sent to the third client terminal to be decrypted by the third client terminal.

Furthermore, the third client terminal receives the fourth public key from the fourth client terminal; generates a third/fourth key switch hint for the fourth client terminal, using the fourth public key and the third private key of the third client terminal; and sends the third/fourth key switch hint from the third client terminal to the mixer. The mixer then uses the third/fourth key switch hint and the fifth switched encrypted data to switch the fifth switched encrypted data to generate sixth switched encrypted data as shown by output 726 in FIG. 7. The sixth switched encrypted data is then sent to the fourth client terminal to be decrypted by the fourth client terminal. This configuration describes a tree-structure key switching scheme, in which the public keys can be shared at any time prior to the start of the data communication that is convenient.

In some embodiments, for example, in the case of voice communication, for the situation where a client would not want to receive its own voice data in the summation, the summation operations would be over a matrix addition where the added data in each column is the result for each client. This added column may be set to 0, if the corresponding recipient of the column is not intended to receive the voice data being added and all other columns would be the data being added. Redundant column data need not be carried through the process. For example, if cij represents the ciphertext from client i in the key j representation, the first summation would be [c22,c12,c12+c22]. The result of the 2nd summation would be [c23+c33,c13+c33,c13+c23, c13+c23+c33]. The result of a 3rd summation would be [c24+c34,c44,c14+c34+c44,c14+c24+c34,c14+c24+c34+ c44].

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for voice and video data encryption and decryption without sharing a private key, in a distributed video conferencing system including a plurality of client terminals communicating data at different data rates, the method comprising:

upon initiating a video conference amongst the plurality of client terminals, receiving by a second client terminal of the plurality of client terminals, a first public key from a first client terminal of the plurality of client terminals;

generating a second/first key switch hint for the first client terminal, by the second client terminal, using the first public key and a second private key of the second client terminal;

transmitting the second/first key switch hint and a second encrypted data from the second client terminal to a mixer;

receiving by a fourth client terminal of the plurality of client terminals, a third public key from a third client terminal of the plurality of client terminals;

generating a fourth/third key switch hint for the third client terminal, by the fourth client terminal, using the third public key and a fourth private key of the fourth client terminal;

transmitting the fourth/third key switch hint and fourth encrypted data from the fourth client terminal to the mixer;

receiving by the third client terminal, the first public key from the first client terminal;

generating a third/first key switch hint for the first client terminal, by the third client terminal, using the first public key and a third private key of the third client terminal;

transmitting the third/first key switch hint from the third client terminal to the mixer;

using, by the mixer, the second/first key switch hint and the second encrypted data from the second client terminal to switch the second encrypted data to generate a first switched encrypted data;

adding, by the mixer, the first switched encrypted data to the first encrypted data received from the first client terminal to output a first summed encrypted data;

using, by the mixer, the fourth/third key switch hint and a third encrypted data from the third client terminal to switch the fourth encrypted data to generate a second switched encrypted data;

adding, by the mixer, the second switched encrypted data to the third encrypted data received from the third client terminal to output a second summed encrypted data;

using, by the mixer, the third/first key switch hint and the second summed encrypted data to switch the second summed encrypted data to generate a third switched encrypted data;

adding, by the mixer, the third switched encrypted data to the first summed encrypted data to output a third summed encrypted data, wherein each encrypted data is encrypted voice or video data, and wherein a private key of each client terminal is not shared by any other client terminal; and transmitting the third summed encrypted data to the first client terminal for decryption and playing back by the first client terminal.

2. The method of claim 1, further comprising receiving by the first client terminal, a second public key from the second client terminal;

generating a first/second key switch hint for the second client terminal, by the first client terminal, using the second public key and a first private key of the first client terminal;

transmitting the first/second key switch hint and first encrypted data from the first client terminal to the mixer;

using, by the mixer, the first/second key switch hint and the third summed encrypted data to switch the third summed encrypted data to generate fourth switched encrypted data; and transmitting the fourth switched encrypted data to the second client terminal for decryption by the second client terminal.

3. The method of claim 2, further comprising receiving by the third client terminal, the first public key from the first client terminal;

generating a third/first key switch hint for the first client terminal, by the third client terminal, using the first public key and a third private key of the third client terminal;

transmitting the third/first key switch hint and third encrypted data from the third client terminal to the mixer;

using, by the mixer, the third/first key switch hint and the third summed encrypted data to switch the third summed encrypted data to generate a fifth switched encrypted data; and transmitting the fifth switched encrypted data to the third client terminal for decryption by the third client terminal.

4. The method of claim 3, further comprising receiving by the third client terminal, a fourth public key from the fourth client terminal;

generating a third/fourth key switch hint for the fourth client terminal, by the third client terminal, using the fourth public key and the third private key of the third client terminal;

transmitting the third/fourth key switch hint from the third client terminal to the mixer;

using, by the mixer, the third/fourth key switch hint and the fifth switched encrypted data to switch the fifth switched encrypted data to generate a sixth switched encrypted data; and transmitting the sixth switched encrypted data to the fourth client terminal for decryption by the fourth client terminal.

5. The method of claim 4, further comprising: combining the third summed encrypted data, the fourth switched encrypted data, the fifth switched encrypted data and the sixth switched encrypted data in a matrix, a first column of the matrix including the third summed encrypted data, a second column of the matrix including fourth switched encrypted data, a third column of the matrix including the fifth switched encrypted data, and a fourth column of the matrix including the sixth switched encrypted data.

6. The method of claim 5, further comprising sending one or more columns of the matrix to a respective client terminal.

7. The method of claim 5, further comprising sending the matrix to all of the client terminals.

8. The method of claim 5, further comprising replacing the content of a respective column of the matrix corresponding to a respective client terminal with all zeroes, before sending the matrix to the respective client terminal.

9. The method of claim 1, wherein the first encrypted data, the second encrypted data, the third encrypted data and the fourth encrypted data are encoded before being encrypted by the respective client terminal.

10. A distributed video conferencing system for communicating data at different data rates and performing voice and video data encryption and decryption without sharing a private key comprising:

a second client terminal that, upon initiating a video conference amongst a plurality of client terminals, receives a first public key from a first client terminal and generates a second/first key switch hint for the first client terminal, using the first public key and a second private key of the second client terminal;

a mixer that receives the second/first key switch hint and a second encrypted data from the second client terminal; and a fourth client terminal that receives a third public key from a third client terminal; generates a fourth/third key switch hint for the third client terminal, using the third public key and a fourth private key of the fourth client terminal; and transmits the fourth/third key switch hint and a fourth encrypted data to the mixer, wherein the third client terminal receives the first public key from the first client terminal; generates a third/first key switch hint for the first client terminal, using the first public key and a third private key of the third client terminal; and transmits the third/first key switch hint to the mixer, and wherein the mixer uses the second/first key switch hint and the second encrypted data from the second client terminal to switch the second encrypted data to generate a first switched encrypted data; and adds the first switched encrypted data to the first encrypted data received from the first client terminal to output a first summed encrypted data;

uses the second/first key switch hint and the second encrypted data from the second client terminal to switch the second encrypted data to generate a first switched encrypted data; and adds the first switched encrypted data to the first encrypted data received from the first client terminal to output a first summed encrypted data;

uses the fourth/third key switch hint and a third encrypted data from the third client terminal to switch the fourth encrypted data to generate a second switched encrypted data; and adds the second switched encrypted data to the third encrypted data received from the third client terminal to output a second summed encrypted data;

uses the third/first key switch hint and the second summed encrypted data to switch the second summed encrypted data to generate a third switched encrypted data; and adds the third switched encrypted data to the first summed encrypted data to output a third summed encrypted data, wherein each encrypted data is encrypted voice or video data, and wherein a private key of each client terminal is not shared by any other client terminal; and transmits the third summed encrypted data to the first client terminal for decryption and playing back by the first client terminal.

11. The distributed video conferencing system of claim 10, wherein the first client terminal receives a second public key from the second client terminal; generates a first/second key switch hint for the second client terminal, using the second public key and a first private key of the first client terminal; and transmits the first/second key switch hint and first encrypted data from the first client terminal to the mixer, and wherein the mixer adds the first/second key switch hint and the third summed encrypted data to switch the third summed encrypted data to generate a fourth switched encrypted data; and transmits the fourth switched encrypted data to the second client terminal for decryption by the second client terminal.

12. The distributed video conferencing system of claim 11, wherein the third client terminal receives the first public key from the first client terminal; generates a third/first key switch hint for the first client terminal, by the third client terminal, using the first public key and a third private key of the third client terminal; and transmits the third/first key switch hint and third encrypted data from the third client terminal to the mixer, and wherein the mixer uses the third/first key switch hint and the third summed encrypted data to switch the third summed encrypted data to generate a fifth switched encrypted data; and transmits the fifth switched encrypted data to the third client terminal for decryption by the third client terminal.

13. The distributed video conferencing system of claim 12, wherein the third client terminal receives a fourth public key from the fourth client terminal; generates a third/fourth key switch hint for the fourth client terminal, by the third client terminal, using the fourth public key and the third private key of the third client terminal; and transmits the third/fourth key switch hint from the third client terminal to the mixer, and wherein the mixer uses the third/fourth key switch hint and the fifth switched encrypted data to switch the fifth switched encrypted data to generate a sixth switched encrypted data; and transmits the sixth switched encrypted data to the fourth client terminal for decryption by the fourth client terminal.

14. The distributed video conferencing system of claim 13, wherein the mixer combines the third summed encrypted data, the fourth switched encrypted data, the fifth switched encrypted data and the sixth switched encrypted data in a matrix, a first column of the matrix including the third summed encrypted data, a second column of the matrix including fourth switched encrypted data, a third column of the matrix including the fifth switched encrypted data, and a fourth column of the matrix including the sixth switched encrypted data.

15. The distributed video conferencing system of claim 14, wherein the mixer sends one or more columns of the matrix to a respective client terminal.

16. The distributed video conferencing system of claim 14, wherein the mixer sends the matrix to all of the client terminals.

17. The distributed video conferencing system of claim 14, wherein the mixer replaces the content of a respective column of the matrix corresponding to a respective client terminal with all zeroes, before sending the matrix to the respective client terminal.

18. The distributed video conferencing system of claim 10, wherein the first encrypted data, the second encrypted data, the third encrypted data and the fourth encrypted data are encoded by the respective client terminals before being encrypted by the respective client terminal.

* * * * *